(12) United States Patent
Kim et al.

(10) Patent No.: US 8,741,488 B2
(45) Date of Patent: Jun. 3, 2014

(54) ELECTRODE INCLUDING SI-CONTAINING MATERIAL LAYER AND POROUS FILM, AND LITHIUM BATTERY EMPLOYING THE SAME

(75) Inventors: Jin-Hee Kim, Yongin-si (KR);
Won-Chull Han, Yongin-si (KR);
Jae-Yun Min, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1099 days.

(21) Appl. No.: 11/490,146

(22) Filed: Jul. 21, 2006

(65) Prior Publication Data

US 2007/0020524 A1    Jan. 25, 2007

(30) Foreign Application Priority Data

Jul. 22, 2005  (KR) ................. 10-2005-0066867

(51) Int. Cl.
*H01M 4/66* (2006.01)
*H01M 2/16* (2006.01)

(52) U.S. Cl.
CPC ............ *H01M 2/1673* (2013.01); *H01M 2/168* (2013.01); *Y02E 60/12* (2013.01); *Y02E 60/50* (2013.01)
USPC ............ 429/247; 429/246; 429/252; 429/523

(58) Field of Classification Search
CPC .... H01M 2/1673; H01M 2/168; Y02E 60/12; Y02E 60/50
USPC .................. 429/246, 247, 252, 523
See application file for complete search history.

(56) References Cited

U.S. PATENT DOCUMENTS

| 4,385,101 A | * | 5/1983 | Catanzarite ................ 429/94 |
| 4,416,915 A | | 11/1983 | Palmer et al. |
| 5,330,852 A | * | 7/1994 | Gerstenberg et al. ...... 428/824.5 |
| 5,354,631 A | | 10/1994 | Chaloner-Gill et al. |
| 5,409,777 A | * | 4/1995 | Kennedy et al. ........... 428/411.1 |
| 6,537,334 B1 | * | 3/2003 | DuPasquier et al. ......... 29/623.5 |
| 6,798,003 B2 | * | 9/2004 | Li et al. ...................... 257/295 |
| 6,912,116 B2 | * | 6/2005 | Takahashi et al. ............ 361/502 |
| 2004/0106040 A1 | * | 6/2004 | Fukuoka et al. ............. 429/212 |
| 2005/0008938 A1 | | 1/2005 | Cho et al. |
| 2006/0222934 A1 | * | 10/2006 | Min et al. ..................... 429/142 |

FOREIGN PATENT DOCUMENTS

| EP | 1 096 591 | | 5/2001 |
| JP | 63293729 A | * | 11/1988 |
| JP | 02-121258 | | 5/1990 |
| JP | 05-286763 | | 11/1993 |
| JP | 05-299073 | | 11/1993 |
| JP | 06-349482 | | 12/1994 |
| JP | 7-296802 | | 11/1995 |
| JP | 07296802 A | * | 11/1995 |
| JP | 07-335623 | | 12/1995 |
| JP | 2000-208134 | | 7/2000 |
| JP | 2001-216961 | | 8/2001 |
| JP | 2003-217575 | | 7/2003 |
| KR | 10-2005-0035282 | | 4/2005 |

* cited by examiner

*Primary Examiner* — Patrick Ryan
*Assistant Examiner* — Ladan Mohaddes
(74) *Attorney, Agent, or Firm* — Robert E. Bushnell, Esq.

(57) ABSTRACT

An electrode which has a Si-containing material layer and a porous film, and a lithium battery employing the same. In the electrode, the Si-containing material layer is applied on an electrode current collector and/or an electrode active material to protect the surface of the electrode current collector from oxidation. Also, the applied Si-containing material layer enhances the adhesion between the electrode current collector and the electrode active material to improve cycle life characteristics. Also, it increases the adhesion between the electrode active material and the porous film to reduce resistance, and to improve ohmic contacts and to lower the Shottkey barrier. In addition, the electrode includes the porous film functioning as a separator, and thus can provide a battery which is safe under conditions of overcharge and heat exposure without needing an additional separator.

18 Claims, 4 Drawing Sheets

ELECTRODE INCLUDING SI-CONTAINING MATERIAL LAYER AND POROUS FILM, AND LITHIUM BATTERY EMPLOYING THE SAME

CROSS-REFERENCE TO RELATED APPLICATIONS AND CLAIM OF PRIORITY

This application claims priority to and the benefit of Korean Patent Application No. 10-2005-0066867 filed on Jul. 22, 2005 in the Korean Intellectual Property Office, the entire contents of which are incorporated herein by reference.

BACKGROUND OF THE INVENTION

1. Field of the Invention

The present invention relates to an electrode including a Si-containing material layer and a porous layer, and a lithium battery employing the same, and more particularly to an electrode, in which a Si-containing material is applied on an electrode current collector and/or an electrode active material, to protect the surface of the electrode current collector from oxidation, and to enhance the adhesion between the electrode current collector and the electrode active material, leading to improvement in cycle life characteristics, and to increase the adhesion between the electrode active material and the porous film, thus reducing resistance, improving ohmic contacts and lowering the Shottkey barrier, and which includes a porous film functioning as a separator, and thus can provide a battery which is safe under conditions of overcharge and heat exposure without needing an additional separator, as well as a lithium battery employing the electrode.

2. Description of the Prior Art

These days, compact and lightweight electrical/electronic devices such as portable phones and notebook computers are being actively developed and produced. Such portable electrical/electronic devices include battery packs such that these devices can be operated without a separate power supply. Such battery packs have at least one battery, and recently, a rechargeable secondary battery has been used in the battery pack in terms of economy. Secondary batteries typically include nickel cadmium (Ni—Cd) batteries, nickel-hydrogen (Ni—H) batteries, and lithium secondary batteries such as lithium (Li) batteries and lithium ion (Li ion) batteries.

Particularly, the lithium secondary batteries are rechargeable through the absorption and release of lithium and can easily reach small size and large capacity. Also, these batteries have initially been the subject of many studies in terms of that the operation voltage thereof is three times as high as nickel-cadmium batteries or nickel-hydrogen batteries and have high energy density per unit weight. However, when a lithium metal is used in a negative electrode, a lot of dendrites grow on the lithium surface when charged, leading to a reduction in charge/discharge efficiency and short-circuits between the electrodes. Another problem is the instability (high reactivity) of lithium itself.

In an attempt to solve these problems, studies to use a carbon material in a negative electrode have been conducted. This kind of negative electrode is disclosed in, for example, Japanese Patent Publication Nos. Hei 5-299073, Hei 2-121258 and Hei 7-335623. In these studies, expansion or shrinkage caused by charge/discharge is reduced compared to the case of using the lithium or lithium alloy, but there are problems in that capacity is reduced and initial charge/discharge efficiency is lowered, compared to the case of using lithium.

For this reason, studies to increase the capacity of batteries by introducing metal such as lithium into a negative electrode have been actively attempted, however, these studies have conducted to increase electrical capacity while avoiding problems such as short circuits by suitably mixing lithium or lithium alloy with a carbon-based material, in view of problems such as the deposition of dendritic lithium and a rapid change in capacity, which occur when the metal such as lithium or alloy thereof is used alone. Regarding the use of these composite materials, Japanese Patent Publication No. 1993-286763 discloses a negative electrode material obtained by mixing a carbon-based material with a metal material of a size similar to that of the carbon material, coating the mixture with an organic compound and calcining the coated material. Also, Japanese Patent Publication No. Hei 6-349482 discloses a method capable of suppressing a rapid reduction in capacity even in high-rate discharge by adding a metal as a conductive agent to carbon for use in a negative electrode or positive electrode active material to reduce the contact resistance between the active materials or to reduce the contact resistance between an electrode current collector and the active material.

However, the structure, in which the electrode active materials are in direct contact with the electrode current collector, has problems in that, due to a difference in the ohmic contacts between a portion, in which the electrode active materials are in contact with the electrode current collector, and another portion, in which the electrode active materials are not in contact with the electrode current collector, a difference in the concentration of electron density occurs, so that the ionization of the electrode current collector progresses, and thus the resistance of the battery increases due to the oxidation of metal, and the ionization easily occurs even at low voltage. Also, it has a problem in that, at a portion in which an electric field line is not concentrated, ions of the electrode current collector are deposited as metals, causing dendritic phenomena.

For this reason, there is a need to solve problems associated with an increase in resistance, a reduction in ohmic contacts, a reduction in cycle life capacity and the like caused by the ionization of the electrode current collector, and to increase adhesion.

Also, in lithium ion batteries, an electrolyte has low ion conductivity. The low ion conductivity of the electrolyte acts as a factor of increasing the internal impedance of the battery to increase the internal voltage drop and of limiting the current and output of the battery, particularly when large current discharged is required.

Furthermore, a separator also acts as a factor of limiting the migration of lithium ions between two electrodes, whereas the separator of the lithium ion battery also functions as a safety factor of preventing the overheating of the battery by itself. If the separator reaches a given temperature or higher due to the abnormalities of the battery, a polyolefin-based porous film, which is a general material forming the separator, will be softened and partially melted. Thus, the micropores of the microporous film, which serve as passages for electrolyte solutions and lithium ions, will be shut down. When the flow of lithium ions stops, the current flow between the internal and external portions of the battery becomes blocked, thereby slowing or stopping the temperature increase in the battery. However, in a high-capacitance secondary battery, a large amount of current can flow over a short period of time. When excessive current flows in such a battery, the temperature in the battery cannot be decreased by shutting down the pores of the separator and blocking current flow. Furthermore, the heat generated by such excessive current flow may cause the separator to continue to melt and destruct. As a result, a short circuit due to the destruction of the separator becomes increasingly possible.

In these circumstances, although blocking the current flow by shutting down the pores of the separator is also important, a countermeasure against melting and contraction of the separator is further important to prevent the battery from overheating. In other words, it is required to stably prevent an internal short-circuit between electrodes even at high temperatures of, for example, 200° C. or higher.

Therefore, there is a need for the development of a lithium-ion secondary battery in which lithium ions can smoothly migrate and which is safe even at high temperatures.

SUMMARY OF THE INVENTION

The present invention can solve the above problems occurring in the prior art.

The present invention can provide an electrode which is prevented from the oxidation of an electrode current collector to reduce resistance, has increased adhesion between the electrode current collector and the an electrode active material to improve ohmic contacts and to lower the Shottkey barrier, and has enhanced adhesion between the electrode active material layer and the porous film layer to prevent the breakdown or detachment of the electrode, making the winding of the electrode easy.

The present invention can also provide an electrode, which has formed therein a porous film functioning as a separator, and thus can provide a battery which is safe under conditions of overcharge and heat exposure without needing an additional separator.

The present invention can also provide a lithium battery which employs the electrode, and thus has improvements in battery capacity and cycle life, and high-output characteristics.

To achieve the above objects and other objects, in one aspect, the present invention provides an electrode comprising: an electrode current collector, a Si-containing material layer, and an electrode active material layer.

The "Si-containing material layer may be a material layer comprising a Si-containing compound, and preferably, can comprise a compound of Formula I (I)

wherein $R_1$, $R_2$ and $R_3$ each independently represents a hydrogen atom, a halogen atom, a hydroxyl group, a substituted or unsubstituted amine group, a substituted or unsubstituted thiol group, a substituted or unsubstituted C1-C20 alkyl group, a substituted or unsubstituted C3-C20 cycloalkyl group, a substituted or unsubstituted C1-C20 alkenyl group, a substituted or unsubstituted C1-C20 alkoxy group, a substituted or unsubstituted C6-C30 aryl group, a substituted or unsubstituted C6-C30 aryloxy group, or a substituted or unsubstituted C1-C20 alkylcarbonyl group;

X is —NR— where R is a substituent, —O—, —SO$_3$—, a substituted or unsubstituted C1-C20 alkylene group, a substituted or unsubstituted C2-C20 alkenylene group, a substituted or unsubstituted silanylene group, a substituted or unsubstituted C6-C30 arylene group, a substituted or unsubstituted peptyl group, a substituted or unsubstituted carbonylene group, a substituted or unsubstituted C1-C20 oxyalkylene group, or aheteroalkylene group; and A represents a hydrogen atom, a halogen atom, a thiol group, a substituted or unsubstituted amino group, a substituted or unsubstituted C2-C15 heterocycloalkyl group, a substituted or unsubstituted C2-C20 alkenyl group, a substituted or unsubstituted C1-C10 silanyl group, a substituted or unsubstituted C6-C20 aryl group, or $(R_4R_5R_6)Si$— represented by where $R_4$, $R_5$ and $R_6$ each independently represents a hydrogen atom, a halogen atom, a hydroxyl group, a substituted or unsubstituted amine group, —SH, a substituted or unsubstituted C1-C20 alkyl group, a substituted or unsubstituted C3-C20 cycloalkyl group, a substituted or unsubstituted C1-C20 alkenyl group, a substituted or unsubstituted C1-C20 alkoxy group, a substituted or unsubstituted C6-C30 aryl group, a substituted or unsubstituted C6-C30 aryloxy group, or a substituted or unsubstituted C1-C20 alkylcarbonyl group.

According to another aspect of the present invention, the Si-containing compound represented by Formula 1 may be represented by Formula II:

(II)

wherein $R_1$, $R_2$ and $R_3$ each independently represents a hydrogen atom, a halogen atom, a hydroxyl group, a substituted or unsubstituted amine group, a substituted or unsubstituted thiol group, a substituted or unsubstituted C1-C20 alkyl group, a substituted or unsubstituted C3-C20 cycloalkyl group, a substituted or unsubstituted C1-C20 alkenyl group, a substituted or unsubstituted C1-C20 alkoxy group, a substituted or unsubstituted C6-C30 aryl group, a substituted or unsubstituted C6-C30 aryloxy group, or a substituted or unsubstituted C1-C20 alkylcarbonyl group;

$R_4$, $R_5$ and $R_6$ each independently represents a hydrogen atom, a halogen atom, a hydroxyl group, a substituted or unsubstituted amine group, —SH, a substituted or unsubstituted C1-C20 alkyl group, a substituted or unsubstituted C3-C20 cycloalkyl group, a substituted or unsubstituted C1-C20 alkenyl group, a substituted or unsubstituted C1-C20 alkoxy group, a substituted or unsubstituted C6-C30 aryl group, a substituted or unsubstituted C6-C30 aryloxy group, or a substituted or unsubstituted C1-C20 alkylcarbonyl group; and $X_1$ is —O—, —NH—, a substituted or unsubstituted C1-C20 alkylene group, a substituted or unsubstituted C2-C20 alkenylene group, or a substituted or unsubstituted C6-30 arylene group.

In further another aspect, the present invention provides an electrode comprising: an electrode current collector, a Si-containing material layer, a porous film; and an electrode active material layer.

The Si-containing material layer may be a layer comprising a Si-containing compound, particularly to a material layer comprising the compound of Formula I, or preferably Formula II.

In still another aspect, the present invention provides an electrode, in which a Si-containing material layer, a electrode active material layer and a porous film are sequentially stacked on at least one surface of an electrode current collector, or in which an electrode active material layer, a Si-containing material layer and a porous film are sequentially stacked on at least one surface of an electrode current collector, or in which a Si-containing material layer, an electrode active material layer, a Si-containing material layer and a porous film are sequentially stacked on at least one surface of an electrode current collector.

In still another aspect, the present invention provides a lithium battery comprising an electrolyte, a negative electrode and a positive electrode, in which at least one of the two electrodes is an electrode having the above-described structure.

In yet still another aspect, the present invention provides a lithium battery comprising an electrolyte, a negative electrode, a positive electrode, and a separator comprising a porous film, in which at least one of the two electrodes is an electrode having the above-described structure.

In yet another aspect of the present invention, a lithium battery is constructed with a negative electrode, a positive electrode, an electrolyte, and a porous film formed by applying a solution for the porous film on at least one of the negative electrode and the positive electrode and removing a solvent from the solution or curing the solution, the solution comprising ceramic particles uniformly dispersed in a liquid material comprised of a binder and the solvent.

In the preferred embodiments of the present invention, when the Si-containing material layer is applied on the surface of the electrode current collector, the Si atom of the Si-containing material layer will react with an OH group on the surface of the electrode current collector to prevent oxidation of the electrode current collector so as to ensure the life cycle thereof and will serve to improve ohmic contacts so as to increase the adhesion between the electrode active material and the electrode current collector. Also, when the Si-containing material layer is applied on the electrode active material layer, the Si atom of the Si-containing material layer will react with an OH group on the negative electrode to remove the OH group, thus reducing the contact angle between the electrolyte and the negative electrode active material. This increases the wettability of the electrolyte, thus enhancing the permeability thereof.

BRIEF DESCRIPTION OF THE DRAWINGS

A more complete appreciation of the embodiments of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Hereinafter, the present invention will be described in further detail.

According to one embodiment of the present invention, the Si-containing material can comprise a compound of Formula I below:

(I)

wherein $R_1$, $R_2$ and $R_3$ each independently represents a hydrogen atom, a halogen atom, a hydroxyl group, a substituted or unsubstituted amine group, a substituted or unsubstituted thiol group, a substituted or unsubstituted C1-C20 alkyl group, a substituted or unsubstituted C3-C20 cycloalkyl group, a substituted or unsubstituted C1-C20 alkenyl group, a substituted or unsubstituted C1-C20 alkoxy group, a substituted or unsubstituted C6-C30 aryl group, a substituted or unsubstituted C6-C30 aryloxy group, or a substituted or unsubstituted C1-C20 alkylcarbonyl group;

X is —NR— (R is a possible substituent such as hydrogen, an alkyl group or the like), —O—, —SO$_3$—, a substituted or unsubstituted C1-C20 alkylene group, a substituted or unsubstituted C2-C20 alkenylene group, a substituted or unsubstituted silanylene group, a substituted or unsubstituted C6-C30 arylene group, a substituted or unsubstituted peptyl group, a substituted or unsubstituted carbonylene group, a substituted or unsubstituted C1-C20 oxyalkylene group, or a heteroalkylene group; and A represents a hydrogen atom, a halogen atom, a thiol group, a substituted or unsubstituted amino group, a substituted or unsubstituted C2-C15 heterocycloalkyl group, a substituted or unsubstituted C2-C20 alkenyl group, a substituted or unsubstituted C1-C10 silanyl group, a substituted or unsubstituted C6-C20 aryl group, or ($R_4R_5R_6$)Si— represented by where $R_4$, $R_5$ and $R_6$ each independently represents a hydrogen atom, a halogen atom, a hydroxyl group, a substituted or unsubstituted amine group, —SH, a substituted or unsubstituted C1-C20 alkyl group, a substituted or unsubstituted C3-C20 cycloalkyl group, a substituted or unsubstituted C1-C20 alkenyl group, a substituted or unsubstituted C1-C20 alkoxy group, a substituted or unsubstituted C6-C30 aryl group, a substituted or unsubstituted C6-C30 aryloxy group, or a substituted or unsubstituted C1-C20 alkylcarbonyl group.

Preferably, $R_1$, $R_2$, $R_3$, $R_4$, $R_5$ and $R_6$ may be each independently a hydrogen atom, a halogen atom, a hydroxyl group, an amine group, —SH, an alkyl group having 1-6 carbon atoms, a cycloalkyl group having 3-8 carbon atoms, an alkenyl group having 2-6 carbon atoms, an alkoxy group having 1-6 carbon atoms, an aryl group having 6-9 carbon atoms, an aryloxy group having 6-9 carbon atoms, or an alkylcarbonyl group having 1-3 carbon atoms, and X is —NH—, —O—, —$SO_3$—, an alkylene group having 1-6 carbon atoms, an alkenylene group having 2-6 carbon atoms, a silanylene group, an arylene group having 6-9 carbon atoms, a peptyl group, a carbonylene group, or an oxyalkylene group having 1-6 carbon atoms.

As used herein, the alkyl groups used in the compound of the present invention include straight or branched monovalent alkyl groups. Preferably, the alkyl group has 1-20 carbon atoms, and more preferably straight or branched monovalent alkyl groups having 1-15 carbon atoms. This term is exemplified by methyl, ethyl, n-propyl, isopropyl, n-butyl, isobutyl, tert-butyl, n-hexyl, noctyl, n-nonyl, n-dodecyl, tridecyl, pentadecyl, n-pentyl, and functional groups such as straight- or branched-chain analogues thereof. More preferred alkyl groups are lower alkyl groups having 1-6 carbon atoms and even more preferred alkyl groups are lower alkyl groups having 1-3 carbon atoms.

As used herein, the term "alkylene group" is represented by the formula —$C_nH_{2n}$— wherein n is an integer ranging from 0 to 20. Examples of the alkylene group include straight- or branched-chain groups, and preferably straight or branched monovalent alkylene groups having 1-15 carbon atoms. This term is exemplified by methylene, ethylene, n-propylene, isopropylene, n-butylene, isobutylene, tert-butylene, n-hexylene, n-octylene, n-nonylene, n-dodecylene, tridecylene, pentadecylene, n-pentylene and functional groups such as straight- or branched-chain analogues thereof. More preferred alkylene groups are lower alkylene groups having 1-6 carbon atoms, and even more preferred alkylene groups are lower alkylene groups having 1-3 carbon atoms.

As used herein, the alkenylene group is represented by the formula —$C_nH_{2n-2}$— wherein n is an integer ranging from 2 to 20.

As used herein, the arylene group is a substituent containing an aromatic ring and may include an arylalkyl or arylalkenyl group. As the aromatic rings, a benzene ring, naphthalene ring, anthracene ring and the like can be used.

According to one embodiment of the present invention, examples of the Si-containing material of Formula I can include materials shown in the following table, but are not limited thereto:

|    | A          | X             | $R_1$   | $R_2$   | $R_3$   |
|----|------------|---------------|---------|---------|---------|
| 1  | —Cl        | —$(CH_2)_3$—  | —OCH3   | —OCH3   | —OCH3   |
| 2  | H2N—       | —$(CH_2)_3$—  | —OC2H5  | —OC2H5  | —OC2H5  |
| 3  | HS—        | —$(CH_2)_3$—  | —OCH3   | —OCH3   | —OCH3   |
| 4  | H—         | —$CH_2$—      | —OCH3   | —OCH3   | —OCH3   |
| 5  | H—         | —$CH_2$—      | —OCH3   | —OCH3   | —CH3    |
| 6  | H—         | —$CH_2$—      | —OC2H5  | —OC2H5  | —OC2H5  |
| 7  | H—         | —$CH_2$—      | —OCH3   | —CH3    | —CH3    |
| 8  | $(CH_3)_2$—| —$(CH_2)_2$—  | —OCH3   | —OCH3   | —OCH3   |
| 9  | H—         |  | —OCH3   | —OCH3   | —OCH3   |
| 10 | H—         | —$CH_2$—      | —Cl     | —Cl     | —Cl     |
| 11 | H—         | —$CH_2$—      | —Cl     | —Cl     | —CH3    |
| 12 | H—         | —$CH_2$—      | —Cl     | —CH3    | —CH3    |
| 13 | H—         | —$CH_2$—$CH_2$— | —Cl   | —CH2CH3 | —CH2CH3 |
| 14 | H—         | —$CH_2$—      | —Cl     | t-butyl | —CH3    |
| 15 | H—         | —CH=CH—       | —OCH3   | —OCH3   | —OCH3   |

-continued

| | A | X | R₁ | R₂ | R₃ |
|---|---|---|---|---|---|
| 16 | H— | —CH=CH— | —OCOCH3 | —OCOCH3 | —OCOCH3 |
| 17 | H2N— | —CH₂NH(CH₂)₃— | —OCH3 | —OCH3 | —OCH3 |
| 18 | H2N— | —(CH₂)₂—NH(CH₂)₃— | —CH3 | —OCH3 | —OCH3 |
| 19 |  | —NH(CH₂)₃— | —OCH3 | —OCH3 | —OCH3 |
| 20 | CH₂—CH— \\O/ | —CH₂O(CH₂)₃— | —OCH3 | —OCH3 | —OCH3 |
| 21 | CH₂—CH— \\O/ | —CH₂O(CH₂)₃— | —CH3 | —OCH3 | —OCH3 |
| 22 | CH₂=CCH₃— | —COO—(CH₂)₃— | —OCH3 | —OCH3 | —OCH3 |
| 23 | CH₂=CCH₃— | —COO—(CH₂)₃— | —CH3 | —OCH3 | —OCH3 |
| 24 | CF₃— | —OSO₂— | —CH3 | —CH3 | —CH3 |
| 25 | (CH₃)₃Si— | —NH— | —CH3 | —CH3 | —CH3 |
| 26 | H2N— | —CONH(CH₂)₃— | —OC₂H₅ | —OC2H5 | —OC2H5 |
| 27 | (CH₃)₃SiNH— | —CONH— | —CH3 | —CH3 | —CH3 |
| 28 | (CH₃)₃SiNH— | —CCF₃O— | —CH3 | —CH3 | —CH3 |
| 29 | Cl(i-Pr)₂Si— | —O— | -iPr | -iPr | —Cl |

The Si-containing compound represented by Formula 1 may be represented by Formula II:

wherein $R_1$, $R_2$ and $R_3$ each independently represents a hydrogen atom, a halogen atom, a hydroxyl group, a substituted or unsubstituted amine group, a substituted or unsubstituted thiol group, a substituted or unsubstituted C1-C20 alkyl group, a substituted or unsubstituted C3-C20 cycloalkyl group, a substituted or unsubstituted C1-C20 alkenyl group, a substituted or unsubstituted C1-C20 alkoxy group, a substituted or unsubstituted C6-C30 aryl group, a substituted or unsubstituted C6-C30 aryloxy group, or a substituted or unsubstituted C1-C20 alkylcarbonyl group;

$R_4$, $R_5$ and $R_6$ each independently represents a hydrogen atom, a halogen atom, a hydroxyl group, a substituted or unsubstituted amine group, —SH, a substituted or unsubstituted C1-C20 alkyl group, a substituted or unsubstituted C3-C20 cycloalkyl group, a substituted or unsubstituted C1-C20 alkenyl group, a substituted or unsubstituted C1-C20 alkoxy group, a substituted or unsubstituted C6-C30 aryl group, a substituted or unsubstituted C6-C30 aryloxy group, or a substituted or unsubstituted C1-C20 alkylcarbonyl group; and $X_1$ is —O—, —NH—, a substituted or unsubstituted C1-C20 alkylene group, a substituted or unsubstituted C2-C20 alkenylene group, or a substituted or unsubstituted C6-30 arylene group.

Preferably, $R_1$, $R_2$, $R_3$, $R_4$, $R_5$ and $R_6$ may be each independently a hydrogen atom, a halogen atom, a hydroxyl group, an amine group, —SH, an alkyl group having 1-6 carbon atoms, a cycloalkyl group having 3-8 carbon atoms, an alkenyl group having 2-6 carbon atoms, an alkoxy group having 1-6 carbon atoms, an aryl group having 6-9 carbon atoms, an aryloxy group having 6-9 carbon atoms, or an alkylcarbonyl group having 1-3 carbon atoms, and $X_1$ is —NH—, —O—, an alkylene group having 1-6 carbon atoms, an alkenylene group having 2-6 carbon atoms, or an arylene group having 6-9 carbon atoms.

According to one preferred embodiment of the present invention, the Si-containing material is HMDS (hexamethyl disilazane).

HMDS

According to one embodiment of the present invention, the thickness of the Si-containing material coating layer is 0.005-1 μm, preferably 0.01-0.05 μm, and more preferably 0.02-0.03 μm.

Hereinafter, an electrode and a lithium battery according to embodiments of the present invention will be described in further detail with reference to the accompanying drawings.

Figure 1:
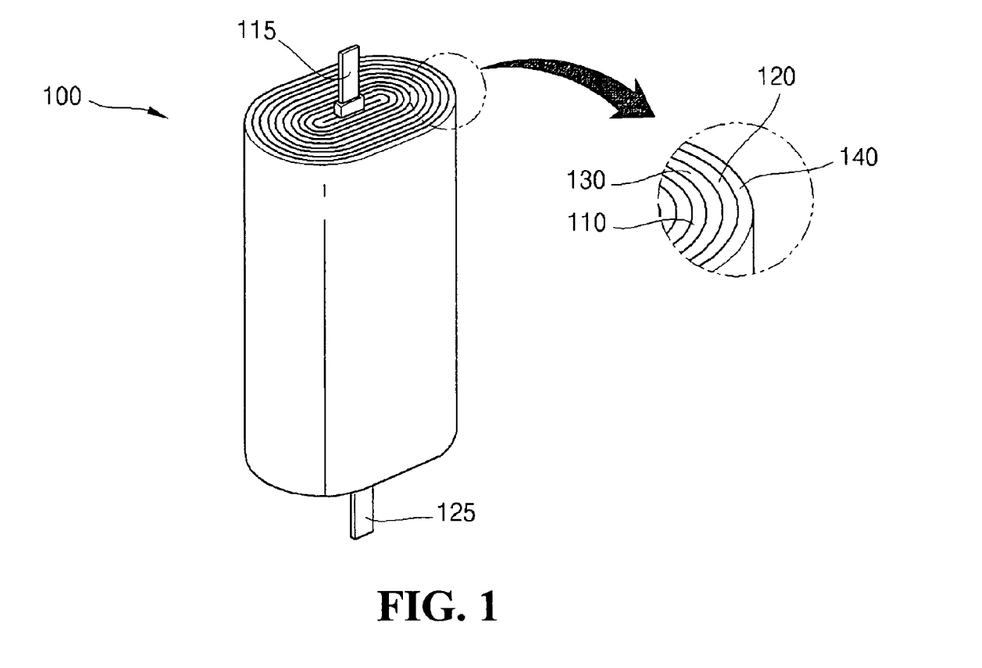
FIG. 1 is a perspective view of an electrode assembly according to one embodiment of the present invention.
Figure 2A:
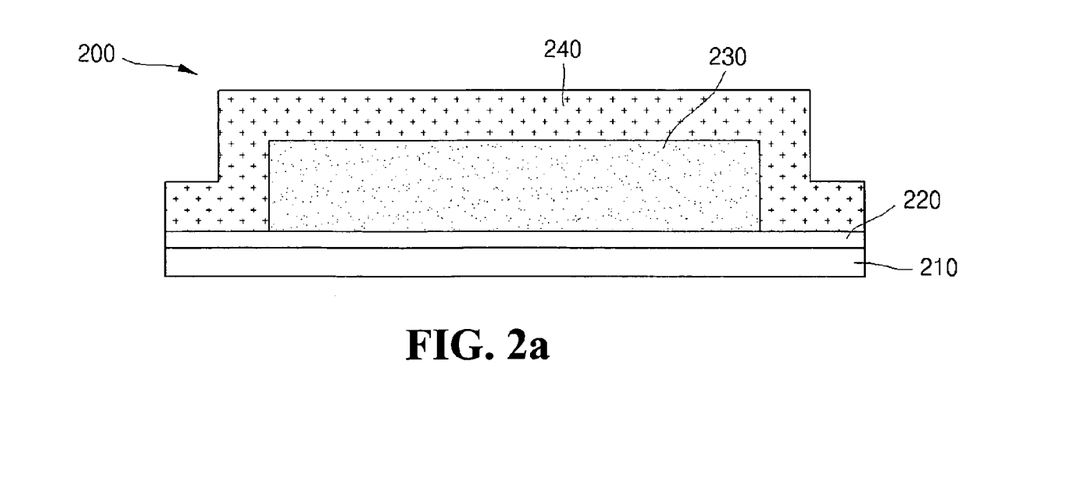
FIGS. 2*a* to 2*c* are cross-sectional views of electrodes according to embodiments of the present invention.
Figure 2B:
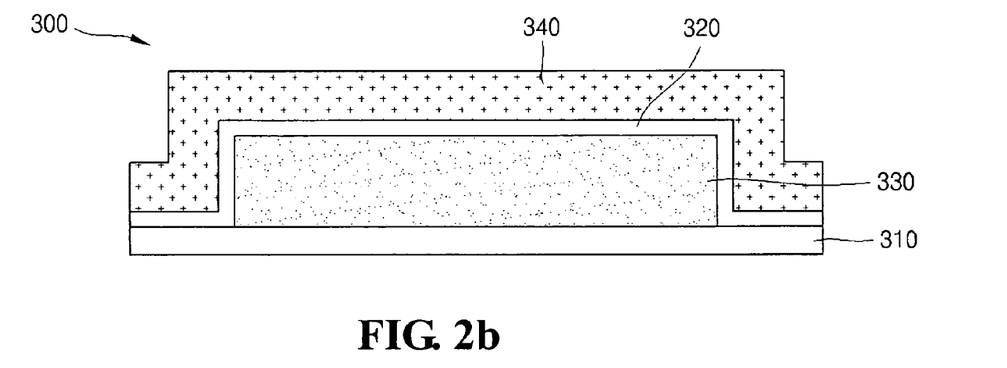
Figure 2C:
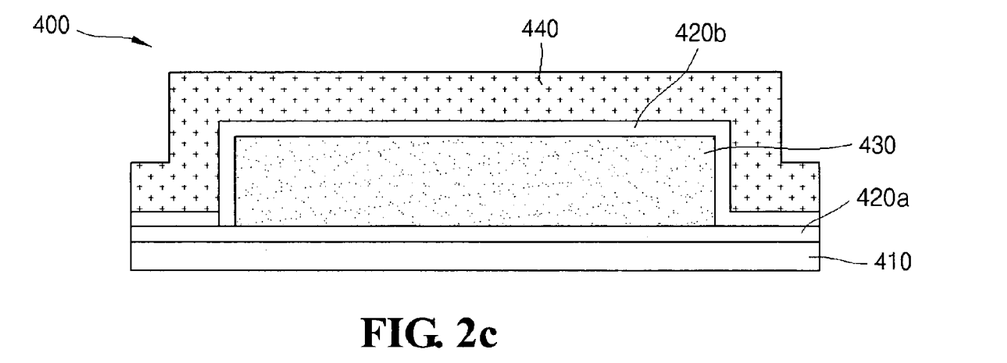
Figure 3:
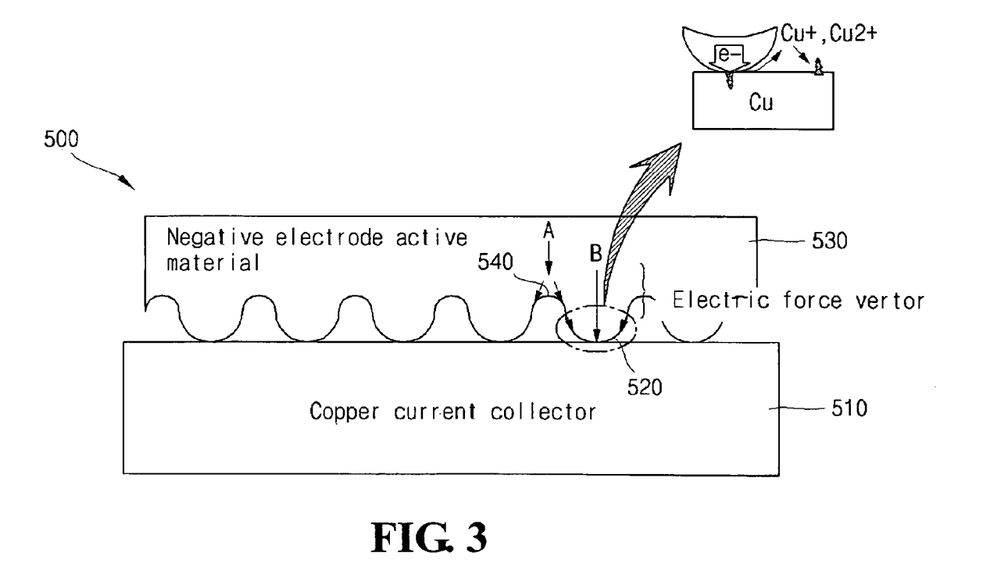
FIG. 3 is a partially enlarged cross-sectional view of a conventional lithium battery.
Figure 4:
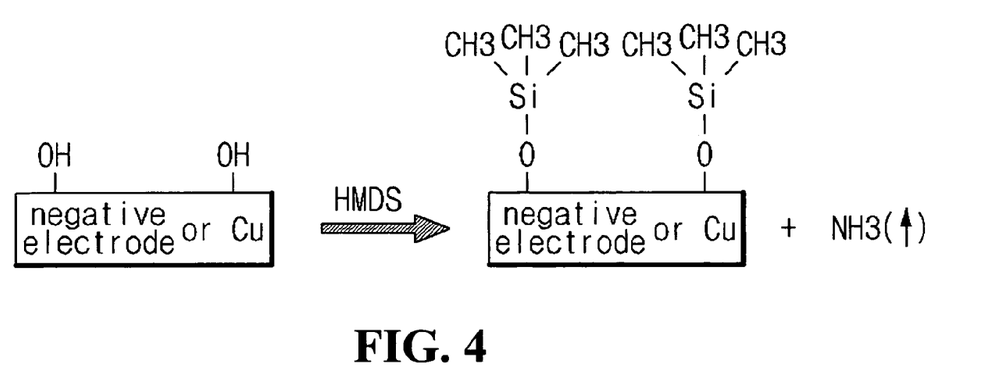
FIG. 4 is a drawing for explaining a reaction occurring on the surface of an electrode according to an embodiment of the present invention.
Figure 5:
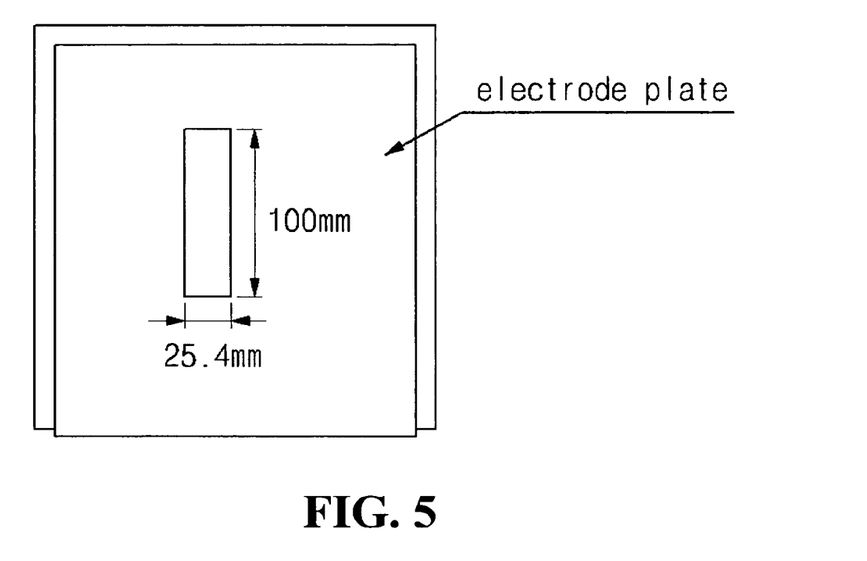
FIG. 5 is a plan view showing the fabrication of a specimen for testing the adhesion of an electrode according to an embodiment of the present invention.

FIG. 1 shows a perspective view of an electrode assembly comprising a lithium battery according to an embodiment of the present invention. FIGS. 2a to 2c show cross-sectional views of electrodes according to embodiments of the present invention. FIG. 3 shows a partially enlarged cross-sectional view of a conventional electrode. FIG. 4 is a drawing for explaining a reaction occurring on the surface of an electrode according to an embodiment of the present invention.

In an electrode assembly 100 in a lithium battery employing an electrode according to an embodiment of the present invention, a positive electrode plate 110 having a positive electrode active material layer formed on a given region of a positive electrode current collector, and a negative electrode plate 120 having a negative electrode active material layer formed on a given region of a negative electrode current collector, are wound together in a jelly-roll shape. Alternatively, the positive electrode plate 110, the negative electrode plate 120, and separators 130 and 140 positioned between the positive electrode plate 110 and the negative electrode plate 120 to prevent the short-circuits therebetween and to permit only the migration of lithium ions, are wound together in a jelly-roll shape.

On at least one surface of the electrode current collector of each of the positive electrode plate 110 and the negative electrode plate 120, a porous film layer is applied to provide a secondary battery which is safe under conditions of overcharge and high temperature. In order to dispose the porous film on at least one of the surfaces of two electrodes which will face each other, the porous film is formed on the outer surface of each of the two electrodes in the case of a jelly roll-type electrode assembly formed by stacking the two electrodes on each other and winding the stacked electrodes together. Alternatively, the porous film may be formed on the inner surface of each of the two electrodes, or be formed on both the inner and outer surfaces of one of the two electrodes.

The porous film does not have to be formed as a separate film, and is formed by applying a solution or precursor solution for the porous film on at least one of surfaces covered with active electrode material slurries and then removing a solvent component from the solution or curing the precursor solution. When the electrode is immersed in a solution for the porous film, which contains secondary particles uniformly dispersed in a liquid material comprised of a binder and a solvent, the inner and outer surface and upper and lower ends of the electrode will be covered with the porous film. (A primary particle means an individual ceramic particle, and a secondary particle means a granule of aggregated primary particles.) Thus, the short circuit between the electrode covered with the porous film and the other electrode can be effectively prevented.

To form the solution for the porous film, a binder material, a solvent and a ceramic powder are first mixed with each other to make a liquid mixture. Preferably, the powder comprised of secondary particles is mixed with the binder and the solvent to form the solution for the porous film. In order to increase the ion conductivity of the porous film without regard to the ion conductivity of the binder, the binder is preferably used in a small amount in the slurry for forming the porous film. In the porous film of the present invention, the ratio of the ceramic material and the binder is preferably 98:2 to 85:15 on a mass basis. This makes it possible to avoid the binder covering a filler material to limit ionic conduction into the filler material. To reduce the amount of the binder, the binder needs to be uniformly dispersed. According to an embodiment of the present invention, when a partially sintered ceramic material is used as the filler and acrylic rubber is used as the binder, the binder will be easily dispersed, so that a film having high porosity can be obtained even using a small amount of the binder.

The mixture thus obtained is applied to a predetermined surface of the electrode. The application of the mixture can be performed by applying the mixture to the entire surface of the electrode using a printing process or a spray process. In one embodiment of the present invention, the porous film can be formed by immersing the electrode plate in the mixture solution, controlling the thickness of the film with a gravure roller and then baking the film. In another embodiment, the porous film on the electrode surface can be formed by various methods, including a method comprising coating the mixture solution on the electrode surface by using a dip coating process and passing the electrode through a dryer at 120° C. to remove the solvent.

The porous film formed according to an embodiment of the present invention may have a thickness of about 1.5-30 μm.

According to one embodiment of the present invention, the porous film layer is characterized by having a porous film in which secondary particles resulting from partial sintering or recrystallization of primary particles of ceramic fillers having a band gap are bound with each other by a binder. In the present invention, the secondary particles in the porous film are preferably grape bunch-shaped or layered particle clusters. Also, in the present invention, the primary particles themselves may also be either grape bunch-shaped particle clusters or layered particle clusters in which needle-shaped particles are combined in the form of a layered structure. The agglomerated secondary particles can be made using various physical or chemical methods. Among these methods, one convenient method may be a method comprising heating the particle material to a temperature around the melting point of the particle material and necking the heated particles. How the ceramic particles are to be melted in a process of agglomerating the particles by partial melting or partial sintering is preferably determined such that, in a subsequent stirring process of mixing the ceramic material with the binder and the solvent to make a paste or dispersed solution for forming the porous film, the characteristic particle shape of the present invention can be maintained and the formed porous films will have low density.

The binder used in the present invention is preferably mainly made of polymer resin. The polymer resin is preferably composed of an acrylate polymer, a methacrylate polymer or a copolymer thereof, which can resist a heat of more than 200° C.

Ceramic materials which can be used in the present invention include zirconium oxide (e.g., $ZrO_2$), alumina ($Al_2O_3$), silica ($SiO_2$), titanium oxide ($TiO_2$), ion conductive glass, and mixtures thereof, preferred being zirconium oxide. Other examples of the ceramic material for forming the porous film include insulating nitrides, hydroxides and ketones of each of zirconium, aluminum, silicon and titanium, and mixtures thereof. Herein, since titanium nitride (TiN) and the like have conductivity and are unsuitable for use as the ceramic material in the present invention, these materials are limited to insulating nitrides. A porous film containing these ceramic materials in large amounts serves to prevent deformation (shrinkage deformation or melting) causing the shirt circuit between the electrodes, even at a high temperature of about 300° C. Also, these materials serve to enhance the stability of the separator, and the partially sintered particle clusters can increase the void ratio or porosity of the porous film.

When these ceramic materials are used, individual particles forming the grape bunch-shaped clusters are preferably 0.01-0.3 µm in size, and scale-shaped individual particles forming the layered clusters are preferably 100 nm to 1 µm in width. Such particle sizes can be observed through scanning electron microscope (SEM) photographs of formed materials showing good properties. In the present invention, the ceramic material forming the porous film layer preferably has a thermal expansion of less than 0.2% at a temperature of 200° C. and a thermal expansion of 0.1-0.4% at a temperature of 400° C. Ceramic materials having a thermal expansion higher than this thermal expansion have a problem in that these deform the shape of the battery itself due to an increase in the internal pressure of the battery.

In the embodiment of the present invention, the porous film comprised of the ceramic material and the polymer resin is preferably formed to have a void ratio of more than 50%. The porosity refers to the area ratio of voids to the total cross-sectional area of the object material, and represents the volumetric porosity of the object material. The void ratio can be determined through a scanning electron microscope (SEM) photograph of the cross-section of the object material.

In the porous film thus formed, the micropores of the ceramic material itself, pores between the particles of the clusters having a grape bunch-shaped structure, and pores between the graph bunch-shaped clusters bound with each other by the binder, all contribute to increasing the porosity of the porous film, and thus, contribute to increasing the permeability of the electrolyte and the mobility of lithium ions in the porous film.

FIGS. 2a to 2c are cross-sectional views of electrodes according to embodiments of the present invention.

Referring to FIGS. 2a to 2c, since the porous film itself can serve as a separator, it is not necessary to dispose an additional separator between the two electrodes. In this configuration, there is no additional separator to shut down in order to block current flow when the battery is overcharged or overheated, but the porous membrane functions as a separator to block the ion flow. More specifically, when the battery is overcharged or overheated, lithium ions are extracted by the portions of the porous membrane that are poorly adhered to the electrodes. Therefore, although the electrodes may be in contact with each other at the points where the porous membrane is poorly adhered to the electrodes, the extraction of lithium ions by the porous membrane blocks the current flow. In addition, when the battery is overheated, a pn junction diode-like structure is formed between the ceramic material and the lithium-containing material. Therefore, the porous membrane, like a separator, functions to block the current flow, thereby ensuring the safety of the battery.

In addition, an insulating film made of a polyolefin resin may be provided between the two electrodes as in the conventional lithium battery. The polyolefin resin insulating film together with the porous membrane serve as the separator in the battery.

As shown in FIGS. 2a to 2c, the method for forming the porous film functioning as a separator on the surface of the electrode has several advantages over conventional methods which use an additional separator.

In the conventional methods which use an additional separator, the separator is laminated on the two electrodes and the resulting product is wound to form an electrode assembly. According to these conventional methods for forming the electrode assembly, the separator and the electrodes may be misaligned, increasing the possibility of a short circuit between the electrodes. However, no misalignment occurs in the formation of the electrode assembly according to an embodiment of the present invention because the separator is coated on the electrodes and is formed together with the electrodes. Therefore, the method according to an embodiment of the present invention does not require an alignment process.

In addition, when the battery is overheated, the separator used in the conventional methods may become contracted, increasing the possibility of a short circuit between the electrodes. Because the separator according to an embodiment of the present invention is coated on the electrodes, the separator does not contract due to the adhering force between the separator and the electrode. Therefore, a short circuit cannot occur between the electrodes when the battery is overheated. In addition, unlike the battery prepared according to the conventional methods, in the battery according to an embodiment of the present invention, the possibility of damaging the battery during manufacturing is reduced.

Just like the electrical resistance of a resistor is inversely proportional to the length of the resistor, the ion conductivity of the separator is inversely proportional to the thickness of the separator. Accordingly, the thinner the separator is, the greater the battery power is. According to an embodiment of the present invention, a thin separator can be formed, making it possible to manufacture a battery with increased power. In addition, when, by forming the porous membrane on the surface of the electrode, the separator according to an embodiment of the present invention formed as one-body with the electrode, the separator does not need to have high mechanical strength as to endure stress during battery manufacturing. Accordingly, the separator can be formed to be thin by flexible material without any limitation due to the mechanical strength of the separator.

Referring to FIG. 2a, an electrode 200 according to one embodiment of the present invention comprises an electrode current collector 210, a Si-containing material layer 220, an electrode active material layer 230, and a porous film layer 240.

In one embodiment of the present invention as shown in FIG. 2a, the Si-containing material layer is applied on the electrode current collector, and it serves to increase the adhesion between the positive electrode active material layer or the negative electrode active material layer and the electrode collector while preventing the oxidation of the electrode current collector and the deintercalation of the electrode active material. Also, because the Si-containing material layer (e.g., HMDS) is applied on the electrode current collector 210, OH groups, which result from the reaction between oxygen in air or water with the electrode current collector and remain on the electrode current collector 210, are dehydrogenated with the Si atom of the Si-containing material to remove the OH groups on the electrode current collector. Also, because the porous film is formed on the electrode active material layer, the short circuit between the two electrodes is prevented without needing an additional separator, while resistance is reduced compared to a battery having a separator, and output properties are improved as a result of an increase in ion conductivity.

The electrode according to an embodiment of the present invention comprises the Si-containing material layer. The inventive electrode will now be compared to the conventional electrode shown in FIG. 3. In the conventional electrode shown in FIG. 3, because the adhesion between an electrode current collector 510 and an electrode active material layer 530 is poor, the electrode current collector has a portion 520 which is in contact with the electrode active material, and a portion 540 which is not in contact with the electrode active material. The electric field line of the contacted portion 520 can flow in a straight line form as shown by "B" in FIG. 3, but the electric field line of the noncontacted portion 540 will flow toward the contacted portion in a branched form as shown by "A" in FIG. 3. Thus, at the contacted portion, electron density is concentrated so that the ionization of the electrode current collector progresses. When the ionization of the electrode current collector is continued, the contacted portion will be broken due to the dissolution of metal, and thus the adhesion between the electrode active material and the electrode current collector becomes poor, leading to a reduction in the cycle life capacity of the battery. Also, at a portion where the electric field line does not flow, metal ions are deposited (dendrite). In an initial stage of the fabrication of a battery from the construction of active material, the battery has a voltage of 3.5V, a reaction occurs at that time point. In other words, in an initial aging stage after the assembly of the battery, metal dendrites can be formed with the passage of time, leading to OCV failure. Also, because metal ions are movable, dendrites can also be formed on a positive electrode. However, according to an embodiment of the present invention, as shown in FIG. 4, because the Si-containing material layer (e.g., hexamethyl disilazane (HMDS) in this embodiment) is applied on the electrode current collector, oxygen in air or water reacts with the electrode current collector, so that OH groups remaining on the metal thin film are dehydrogenated with the Si atoms of the Si-containing material, so as to remove the OH groups on the electrode current electrode while forming Si—O bonds. Thus, according to the present invention, it is possible to increase the adhesion between the metal collector and the electrode active material, making it possible to bringing the entire surface of the metal collector into contact with the electrode active material, thus preventing the concentration of current density. This can prevent the oxidation of the metal current collector, thus preventing an increase in battery resistance and preventing ionization resulting from an increase in voltage. Also, this improves ohmic contacts to reduce the Shottkey barrier. Thus, the resistance of the negative electrode is decreased by about 40%, and the resistance of the battery is decreased by about 20% compared to a battery untreated with the Si-containing material layer. Also, the adhesion between the electrode current collector and the electrode active material is improved, so that these elements are not delaminated and show improved strength. Accordingly, when the electrode according to the present invention is used, it is possible to fabricate a battery having reduced resistance and improved cycle life properties.

FIG. 2b is a cross-sectional view of an electrode according to another embodiment of the present invention.

As shown in FIG. 2b, an electrode 300 comprises an electrode current collector 310, an electrode active material layer 330, a Si-containing material layer 320 and a porous film 340.

The Si-containing material layer 320 is formed on the electrode active material layer 330. Referring to FIG. 4, because the Si-containing material is applied on the electrode active material layer after coating and rolling the electrode active material layer, OH groups on the electrode can be removed to reduce the contact angle between the electrolyte and the electrode active material, thus increasing the wettability of the electrolyte.

FIG. 2c is a cross-sectional view of an electrode according to still another embodiment of the present invention. As shown in FIG. 2c, an electrode 400 according to still another embodiment of the present invention comprises an electrode current collector 410, a Si-containing material layer 420a, an electrode active material layer 430, a Si-containing material layer 420b, and a porous film 440, which are sequentially stacked on each other. In this electrode, as described above, the adhesion between the electrode current collector 410 and the electrode active material layer 430 is increased to prevent the oxidation of the electrode current collector. Also, the deintercalation of the electrode active material is prevented to improve cycle life properties, and the contact angle between the electrode active material and the electrolyte is decreased to improve the wettability of the electrolyte. Also, because the adhesion between the electrolyte active material and the porous film is increased, a battery comprising this electrode has excellent cycle life properties, low battery resistance, high capacity, and excellent short circuit resistance and thermal resistance.

In this embodiment, the Si-containing material layer is preferably formed on a negative electrode plate in terms of cost.

According to one embodiment of the present invention, the Si-containing material layer is preferably applied using a vapor-phase deposition process.

In the present invention, the electrode current collector may be made of a metal used in a conventional secondary battery, for example, aluminum or copper.

The electrode active materials used in the present invention are electrode active materials used in a conventional secondary battery. Examples of the positive electrode active material, which is used in the present invention, include lithium oxides, including $LiCoO_2$, $LiMn_2O_4$, $LiNiO_2$, $LiMnO_2$ and the like, and examples of the negative active material include natural graphite, artificial graphite or a mixture thereof, Si, Sn, tin oxide, composite tin alloys, transition metal oxides, lithium metal nitrides, and lithium metal oxides.

According to an embodiment of the present invention, electrodes each containing the electrode current collector, the electrode active material layer, the Si-containing material layer and the porous film are stacked and wound together.

A method for forming a lithium battery according to one embodiment of the present invention includes: applying a slurry containing a binder resin and an electrode active material on an electrode current collector to form an electrode; forming a porous film on the surface of the electrode in such a manner that the porous film is present on at least one of the surfaces of two electrodes which will face each other in the battery, forming a Si-containing material layer on the electrode current collector and/or the electrode active material; and forming an electrode assembly comprising at least one abovementioned electrode.

The battery comprising the electrode according to an embodiment of the present invention can be fabricated in the following manner.

First, a positive active material, a conductive material, a binder and a solvent are mixed with each other to prepare a positive electrode active material composition. The positive electrode active material composition is coated directly on an electrode current collector and dried to prepare a positive electrode plate. Alternatively, the positive electrode may also be prepared by casting the positive electrode active material composition on a separate support, peeling the cast film from the support, and laminating the film on the electrode current collector.

As the positive electrode active material for the present invention, any material conventionally known as the positive active material in the art can be used. Examples thereof include $LiCoO_2$, $LiMn_xO_{2X}$, $LiNi_{1-x}Mn_xO_{2X}(x=1, 2)$, $Ni_{1-x-y}Co_{2x}MnO_2$, and more specifically, compounds allowing the oxidation and reduction of lithium, for example, $LiMn_2O_4$, $LiCoO_2$, $LiNiO_2$, $LiFeO_2$, $V_2O_2$, TiS and MoS.

As the conductive material, carbon black can be used, and examples of the binder include vinylidene fluoride/hexafluoropropylene copolymer, polyvinylidene fluoride, polyacrylonitrile, polymethylmethacrylate, polytetrafluoroethylene, and mixtures thereof, and styrene butadiene rubber polymers.

Examples of the solvent include N-methylpyrrolidone, acetone, water and the like.

The content of each of the positive electrode active material, the conductive material, the binder and the solvent can be in the range conventionally used in the art.

As the separator, any material can be used as long as it is used in lithium batteries. Particularly, it is preferable to use a material which has low resistance to the migration of electrolyte ions while having excellent ability to be wetted with an electrolyte. More preferably, it is made of a material selected from among glass fiber, polyester, Teflon, polyethylene, polypropylene, polytetrafluoroethylene (PTFE), and mixtures thereof, and may be in the form of woven fabric or non-woven fabric.

As the electrolyte, any material can be used as long as it is used in lithium batteries. For example, it is possible to use, as the electrolyte, a solution of at least one lithium salt selected from the group consisting of $LiPF_6$, $LiBF_4$, $LiSbF$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_6)(C_yF_{2y+1}SO_2)$ (x, y=natural number), LiCl and LiI, which is dissolved in a solvent selected from the group consisting of propylene carbonate, ethylene carbonate, diethyl carbonate, ethyl methyl carbonate, methyl propyl carbonate, butylenes carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulforane, dichloroethane, chlorobenzene, nitrobenzene, dimethyl carbonate, methylethyl carbonate, diethyl carbonate, methylpropyl carbonate, methylisopropyl carbonate, ethylpropyl carbonate, dipropyl carbonate, dibutyl carbonate, diethylene glycol, and mixtures thereof.

According to embodiments of the present invention, the separator is disposed or not disposed between positive and negative electrodes each containing the porous film, thereby forming an battery assembly. Alternatively, the separator is disposed or not disposed between positive and negative electrodes having the porous film and Si-containing material layer formed on at least surface thereof, thereby forming a battery assembly. This battery assembly is wound or folded, and then placed in a cylindrical battery case or angular battery case, into which an electrolyte is then injected, thereby fabricating a battery.

Hereinafter, the present invention will be described in further detail with reference to examples, reference examples, and comparative examples. It is to be understood, however, that these examples are for illustrative purposes only and are not to be construed to limit the scope of the present invention.

Fabrication of Negative Electrode

Example 1

50 g of a poly(vinylidene fluoride (PVDF) binder and 1000 g of graphite having an average diameter of 20 μm were added to 700 g of a n-methyl-pyrrolidone (NMP) solvent, and then stirred using a mechanical stirrer for about 30 minutes to prepare a negative active material slurry. The slurry was applied on a copper current collector to a thickness of about 150 μm, and dried and then further dried at 150° C. in a vacuum. Then, to form a porous film, sintered particles obtained by heating zirconium oxide at 900° C. for about 10 minutes were mixed with 95 g of the binder and 5 g of modified soluble acrylonitrile rubber (BM-720H, Zeon Co., Ltd., Japan) at a weight ratio of zirconium oxide:binder of 95:5 in 150 ml of a solvent to make a liquid mixture. The electrode plate was immersed in the liquid mixture, and the thickness of the film formed on the plate was controlled to 20 μm using a gravure roller. Then, the film was dried at 120° C., and thermally treated at 150° C. for the polymerization of the binder, thus forming a porous film. In this way, the negative electrode plate according to an embodiment of the present invention was fabricated.

Example 2 a HMDS (OAP, Tokyo Ohka Kogyo Co. Ltd) layer was formed on a copper (Cu) current collector to a thickness of 0.005 μm by vapor phase deposition. Then, 50 g of a PVDF binder and 1000 g of graphite having an average diameter of 20 μm was added to 700 g of a NMP solvent and stirred using a mechanical stirrer for 30 minutes to prepare a negative electrode active material slurry. Then, the slurry was applied on the HMDS layer to a thickness of about 150 μm, and dried and then further dried at 150° C. in a vacuum. Then, to form a porous film, sintered particles obtained by heating zirconium oxide 900° C. for about 10 minutes were mixed with 95 g of a binder and 5 g of modified soluble acrylonitrile rubber (BM-720H, Zeon Co., Ltd., Japan) at a weight ratio of zirconium oxide:binder of 95:5 in 150 ml of a solvent to make a liquid mixture. The electrode plate was immersed in the liquid mixture, and the thickness of the film formed on the plate was controlled to 20 μm using a gravure roller. Then, the film was dried at 120° C., and thermally treated at 150° C. for the polymerization of the binder, thus forming a porous film. In this way, the negative electrode plate according to an embodiment of the present invention was fabricated.

Example 3

50 g of a PVDF binder and 1000 g of graphite having an average diameter of 20 μm was added to 700 g of a NMP solvent and then stirred using a mechanical stirrer for 30 minutes to prepare a negative electrode active material slurry. The slurry was applied on a cupper current collector to form thickness of about 150 μm of a negative electrode active material layer, and dried and then further dried at 150° C. in a vacuum. Then, a HMDS (OAP, Tokyo Ohka Kogyo Co. Ltd) layer was formed on the negative electrode active material layer to a thickness of 0.005 μm by vapor phase deposition. Then, to form a porous film, sintered particles obtained by heating zirconium oxide 900° C. for about 10 minutes were mixed with 95 g of a binder and 5 g of modified soluble acrylonitrile rubber (BM-720H, Zeon Co., Ltd., Japan) at a weight ratio of zirconium oxide:binder of 95:5 in 150 ml of a solvent to make a liquid mixture. The electrode plate was immersed in the liquid mixture, and the thickness of the film formed on the plate was controlled to 20 μm using a gravure roller. Then, the film was dried at 120° C., and thermally treated at 150° C. for the polymerization of the binder, thus forming a porous film. In this way, the negative electrode plate according to an embodiment of the present invention was fabricated.

Example 4 a HMDS (hexamethyl disilazane) (OAP, Tokyo Ohka Kogyo Co. Ltd) layer was formed on a copper (Cu) current collector to a thickness of 0.005 μm by vapor phase deposition. Then, 50 g of a PVDF binder and 1000 g of graphite having an average diameter of 20 μm was added to 700 g of a NMP solvent and then stirred using a mechanical stirrer for 30 minutes to prepare a negative electrode active material slurry, which was then applied on the HMDS layer to form a thickness of about 150 μm of a negative electrode active material layer, and dried and then further dried at 150° C. in a vacuum. Then, another HMDS (OAP, Tokyo Ohka Kogyo Co. Ltd) layer was formed on the negative electrode active material layer to a thickness of 0.005 μm by vapor phase deposition. Then, to form a porous film, sintered particles obtained by heating zirconium oxide 900° C. for about 10 minutes were mixed with 95 g of a binder and 5 g of modified soluble acrylonitrile rubber (BM-720H, Zeon Co., Ltd., Japan) at a weight ratio of zirconium oxide:binder of 95:5 in 150 ml of a solvent to make a liquid mixture. The electrode plate was immersed in the liquid mixture, and the thickness of the film formed on the plate was controlled to 20 μm using a gravure roller. Then, the film was dried at 120° C., and thermally treated at 150° C. for the polymerization of the binder, thus forming a porous film. In this way, the negative electrode plate according to an embodiment of the present invention was fabricated.

Example 5

A negative electrode was fabricated in the same manner as in Example 2, except that the thickness of HMDS was 0.05 μm.

Example 6

A negative electrode was fabricated in the same manner as in Example 3, except that the thickness of HMDS was 0.05 μm.

Example 7

A negative electrode was fabricated in the same manner as in Example 4, except that the thickness of HMDS was 0.05 μm.

Example 8

A negative electrode was fabricated in the same manner as in Example 2, except that the thickness of HMDS was 1 μm.

Example 9

A negative electrode was fabricated in the same manner as in Example 3, except that the thickness of HMDS was 1 μm.

Example 10

A negative electrode was fabricated in the same manner as in Example 4, except that the thickness of each of the HMDS layers was 1 μm.

Examples 11 to 18

A negative electrode was fabricated in the same manner as in Example 2 in Example 11, and negative electrodes were fabricated in the same manner as in Example 2 except that the HMDS layer was formed to a thickness of 0.01 μm, 0.02 μm, 0.03 μm, 0.05 μm, 0.07 μm, 0.09 μm and 1 μm in Examples 12-18, respectively.

Examples 19 to 26

Negative electrodes were fabricated in the same manner as in Example 4, except that the thickness of the HMDS layer formed on the electrode current collector was 0.02 μm in all Examples 19-26, and the thickness of the HMDS layer formed on the electrode active material was 0.005 μm, 0.01 μm, 0.02 μm, 0.03 μm, 0.05 μm, 0.07 μm, 0.09 μm and 1 μm in Examples 19-26, respectively.

Comparative Example 1

50 g of a PVDF binder and 1000 g of graphite having an average diameter of 20 μm were added to 700 g of a NMP solvent, then stirred using a mechanical stirrer for 30 minutes to prepare a negative electrode active material slurry. Then, the slurry was applied on a copper current collector to a thickness of about 150 μm, dried and then additionally dried at 150° C. in a vacuum, thus fabricating a negative electrode plate.

Reference Example 1

A negative electrode was fabricated in the same manner as in Example 2, except that the thickness of the HMDS layer formed on the copper current collector was 0.2 μm.

Reference Example 2

50 g of a PVDF binder and 1000 g of graphite having an average diameter of 20 μm were added to 700 g of a NMP solvent, then stirred using a mechanical stirrer for 30 minutes to prepare a negative electrode active material slurry. Then, the slurry was applied on a copper current collector to form a thickness of about 150 μm of a negative electrode active material layer, dried and then additionally dried at 150° C. in a vacuum. Then, a HMDS (OAP, Tokyo Ohka Kogyo Co. Ltd) layer was formed on the negative electrode active material layer to a thickness of 0.005 μm by vapor phase deposition, thus fabricating a negative electrode plate.

Fabrication of Lithium Battery

Examples 27 to 35

Each of the negative electrodes fabricated in Examples 2-10 were used as a counter electrode of lithium metal. Also, a PE separator having a thickness of 16 μm was used. Also, a solution of 1.3M $LiPF_6$ in EC (ethylene carbonate)+EMC (ethylmethyl carbonate) (3/7 vol %) was used as an electrolyte. Using these elements, cylindrical batteries (18650-size and 2000 mAh) were fabricated according to a conventional method.

Examples 36 to 45

Using each of the negative electrodes fabricated in Examples 1 to 10 as a counter electrode of lithium metal, batteries were fabricated in the same manner as in Example 27, except that an additional separator was not used in Examples 36 to 45.

Comparative Example 2

A battery was fabricated in the same manner as in Example 27, using, as a counter electrode of lithium metal, the negative electrode fabricated in Comparative Example 1, which was not treated with HMDS and did not contain a porous film.

Reference Example 3

A battery was fabricated in the same manner as in Example 27, using, as a counter electrode of lithium electrode, the negative electrode fabricated in Example 1, which contained the porous film.

Reference Example 4

A battery was fabricated in the same manner as in Example 27, using, as a counter electrode of lithium metal, the negative electrode fabricated in Reference Example 2, which was treated with HMDS, but did not contain the porous film.

Tests of Properties of Electrode Current Collector and Negative Electrodes Caused by Treatment with HMDS The properties of electrode current collectors and negative electrodes, caused by treatment with HMDS, were tested in the following in the following manner. The test results are shown in Table 1 below.

Test of Discoloration of Electrode Current Collectors

Electrode current collectors were immersed in an electrolyte solution of 1.3M $LiPF_6$ in EC (ethylene carbonate)+EMC (ethyl methyl carbonate) (3/7 vol %). After 24 hours, a change in the color of the electrode current collectors was visually observed.

Figure 6:
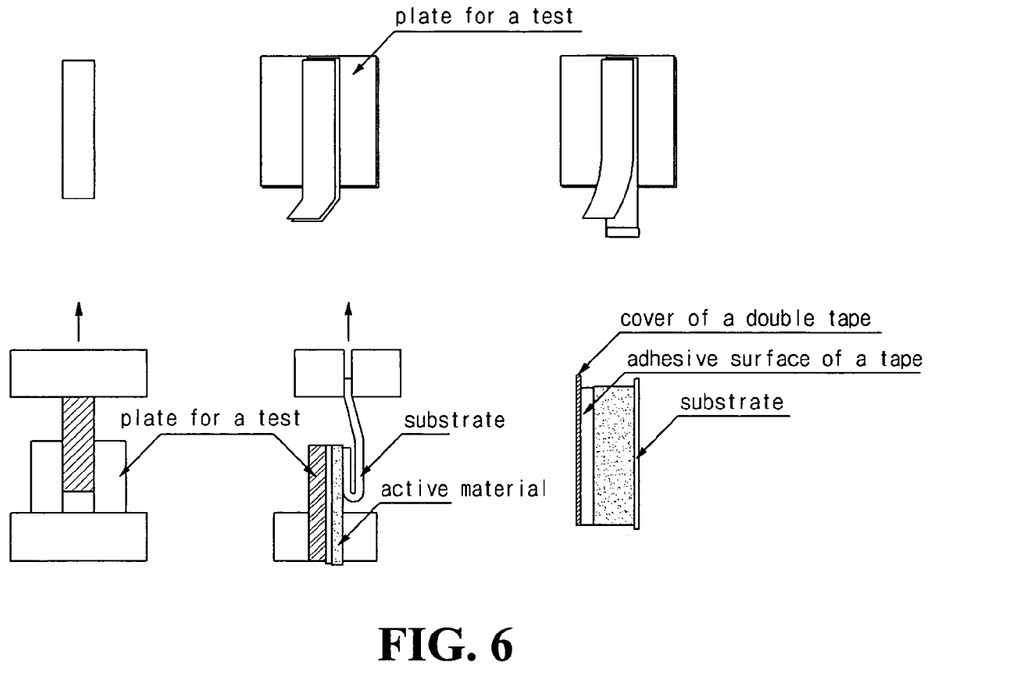
FIG. 6 is a flow chart showing a process for testing the adhesion of an electrode according to an embodiment of the present invention.

Test of Adhesion of Electrode Current Collector and Negative Electrode Active Material As shown in FIG. 6, the electrodes fabricated according to Examples 11 to 18 and Comparative Example 1 were cut with a steel ruler to a size of 25.4 (width)×100 mm (length) to make a sample. After the power switch of a tensile tester (Hounsfield test equipment, serial No. 0050 model 100RC) and the power switch of a PC were turned on, and then software for driving the tester was executed. A protective film of a double side adhesive tape was removed and the adhesive surface of the tape was adhered to a test plate (glass plate). A substrate comprised of a copper current collector was slowly detached starting with the end of the sample, which was not adhered to the test plate (the negative electrode active material would remain adhered to the tape, and the substrate would be detached). Each of the test glass plate having the negative electrode active material adhered thereto, and the substrate, was mounted on the tensile tester using a pedal (see FIG. 6). A tester action button was clicked. The test was performed at a tensile rate of 100 mm/min and an elongation length of 50 mm. Peeling strength (180° angle) was measured.

The measured value was read according to a standard format supported by the drive software, and among values indicated as maximum (MAX), minimum (MIN), and average (AVE)., an average value was taken.

TABLE 1

| | Thickness of HMDS on copper foil | Discoloration | Adhesion gforce/mm |
|---|---|---|---|
| Comparative Example 1 | Untreated with HMDS | Yes | 3.49 |
| Example 11 | 0.005 μm | No | 4.58 |
| Example 12 | 0.01 μm | No | 5.48 |
| Example 13 | 0.02 μm | No | 5.68 |
| Example 14 | 0.03 μm | No | 5.02 |
| Example 15 | 0.05 μm | No | 5.99 |
| Example 16 | 0.07 μm | No | 6.04 |
| Example 17 | 0.09 μm | No | 5.89 |
| Example 18 | 1 μm | No | 5.76 |

Adhesion Between Negative Electrode Active Material and Porous Film, Caused by Treatment with HMDS The electrode plates fabricated in Examples 19 to 26 and Reference Example 1 were tested for the adhesion between the electrode current collector and the negative electrode active material, caused by treatment with HMDS. The test was carried out in the following manner. In this test, a metal substrate comprised of a copper current collector basically treated with 0.02-μm thick HMDS was used. This was used to prevent electrode active material detached from the metal current collector during the measurement of adhesion between the negative electrode and the copper current collector, due to insufficient adhesion therebetween, from having an effect on test results.

TABLE 2

| | Thickness of HMDS on negative electrode active material | Adhesion (gforce/mm) between negative electrode active material and porous film (after drying and polymerization) |
|---|---|---|
| Reference Example 1 | Untreated with HMDS | 1.003 |
| Example 19 | 0.005 μm | 2.727 |
| Example 20 | 0.01 μm | 3.104 |
| Example 21 | 0.02 μm | 3.003 |
| Example 22 | 0.03 μm | 3.164 |
| Example 23 | 0.05 μm | 2.988 |
| Example 24 | 0.07 μm | 2.986 |
| Example 25 | 0.09 μm | 3.021 |
| Example 26 | 1 μm | 2.897 |

Test of Battery Performance

To examine the separator function and stabilization function of the porous film, the batteries prepared in Examples 27 to 35, were evaluated for resistance, discharge and cycle life capacities, and safety, comparatively with the battery fabricated in Comparative Example 2 and Reference Examples 3 and 4. The test was performed in the following manner, and the test results are shown in Table 3 below.

i. Tests of Resistance, Discharge and Cycle Life Capacities

The resistances of the batteries of Examples 27-45 were measured with a standard resistor, and then expressed as percentages relative to the AC impedance of Comparative Example 2 taken as 100%, and the cut-off discharge capacities of the batteries of Examples 27-45 were measured at 3C/3V and expressed as percentages relative to the voltage of Comparative Example 2 taken as 100%. The cycle life capacities were measured after 300 charge/discharge cycles and expressed as percentages relative to the capacity of Comparative Example 2 taken as 100%. Each of the above values is the average of five measurements for each battery.

ii. Evaluation of Safety

The safety of each of the batteries was evaluated on the following five scales after overcharging the batteries at 2C/12V for 12 hours: L0: good; L1: leaked; L2: flash; L2: flame; L3: smoking; L4: firing; and L5: explosion. 2-20 batteries for each Example were tested and a numeral before L in Table 3 represents the number of tested batteries.

iii. Oven Test

The batteries were left to stand in a chamber at 150° C. for 1 hour, and the results were expressed in the same manner as in the overcharge test.

TABLE 3

|  | Resistance (%) | 3 C discharge (%) | Cycle life (%) | 2 C/12 V overcharge | Oven test (150° C.) |
|---|---|---|---|---|---|
| Comparative Example 2 | 100 | 100 | 100 | 15L0, 5L5 | 15L0, 5L5 |
| Reference Example 3 | 104 | 98 | 97 | 15L0, 5L5 | 15L0, 5L5 |
| Reference Example 4 | 98 | 99 | 99 | 7L0, 13L5 | 5L0, 15L5 |
| Example 27 | 96 | 115 | 105 | 17L0, 3L5 | 18L0, 2L4 |
| Example 28 | 97 | 116 | 107 | 18L0, 2L3 | 17L0, 3L3 |
| Example 29 | 95 | 120 | 110 | 19L0, 1L2 | 19L0, 1L2 |
| Example 30 | 86 | 127 | 125 | 2L0 | 2L0 |
| Example 31 | 87 | 126 | 124 | 2L0 | 2L0 |
| Example 32 | 80 | 130 | 130 | 2L0 | 2L0 |
| Example 33 | 87 | 121 | 115 | 19L0, 1L3 | 2L0 |
| Example 34 | 88 | 120 | 120 | 2L0 | 2L0 |
| Example 35 | 83 | 125 | 125 | 2L0 | 2L0 |

Tests of Battery Performance Caused by Treatment with HMDS

To examine the performance of batteries, caused by treatment with HMDS, and the separator function and stabilization function of the porous film, the inventive batteries having no additional separator were evaluated for resistance, discharge and cycle life capacities, and safety, comparatively to the conventional batteries. The evaluation was performed in the same manner as described above, and the results are shown in Table 4 below.

TABLE 4

|  | Resistance (%) | 3 C discharge (%) | Cycle life (%) | 2 C/12 V overcharge | Oven test (150° C.) |
|---|---|---|---|---|---|
| Comparative Example 2 | 104 | 98 | 97 | 15L0, 5L5 | 15L0, 5L0 |
| Example 36 | 50 | 150 | 120 | 15L, 5L0 | 15L0, 5L5 |
| Example 37 | 45 | 151 | 125 | 19L0, 1L3 | 19L0, 1L3 |
| Example 38 | 46 | 153 | 128 | 18L0, 2L3 | 19L0, 1L3 |
| Example 39 | 40 | 155 | 130 | 19L0, 1L3 | 2L0 |
| Example 40 | 30 | 155 | 132 | 2L0 | 2L0 |
| Example 41 | 28 | 158 | 134 | 2L0 | 2L0 |
| Example 42 | 25 | 160 | 135 | 2L0 | 2L0 |
| Example 43 | 33 | 161 | 135 | 2L0 | 2L0 |
| Example 44 | 34 | 163 | 134 | 2L0 | 2L0 |
| Example 45 | 30 | 165 | 138 | 2L0 | 2L0 |

As shown in Table 1 above, in the case of Examples 11 to 18 where the electrode current collector was treated with the Si-containing material (HMDS in Examples), the adhesion between the electrode current collector and the electrode active material was increased compared to the electrode represented by Comparative Example 1, and the electrode current collector was not discolored, suggesting that oxidation was prevented. Thus, in the electrodes of Examples 11-18, the dissolution of metal ions from the electrode can be prevented.

Also, as shown in Table 2, in the case of Examples 19-26 where the electrode active material layer was treated with the Si-containing material (MMDS in Examples), the adhesion between the electrode active material layer and the porous film layer was at least two times higher than that of the electrode of Reference Example 1. Thus, the electrodes of Examples 19-16 have reduced resistance, are easily wound, have increased ion conductivity and excellent high-output characteristics. When the porous film is formed on the surface of the electrode such that the separator is integral with the electrode, the separator can be formed of a soft material to a small thickness without a limitation on the strength thereof, because the separator does not need to have mechanical strength so high that it can maintain itself.

As shown in Table 3, in the case of inventive Examples 27 to 35 where the electrode current collector and/or the electrode active material was treated with HMDS, and the batteries comprising the porous film and the separator were fabricated, the batteries treated with HMDS had reduced resistance and increased cycle life and were stable under conditions of overcharge high temperatures, compared to the battery of Comparative Example 2 and Reference Example 3 untreated with HMDS and the battery of Reference Example 4 not containing the porous film. Also, in the case of the batteries treated with HMDS, the electrodes of Examples further comprising the porous film showed improved characteristics under conditions of overcharge and heat exposure, compared to the battery of Reference Example 4 containing the separator without the porous film. This suggests that the formation of the porous film provided an improvement in safety.

As shown in Table 4, in the case of Examples 36-45 where the electrode current collector and/or the electrode active material was treated with HMDS, and the batteries having the porous film in place of the separator were fabricated, the batteries had reduced resistance, increased discharge capacity and cycle life compared to the conventional battery represented by Comparative Example 2, and these inventive batteries showed relatively high safety in the overcharge and oven tests.

Accordingly, the present invention provides an improved electrode and a lithium battery which has excellent cycle life characteristic, low battery resistance, high capacity, and excellent safeties such as short-circuit resistance and thermal resistance.

As described above, in the electrode according to the present invention, the Si-containing material layer is applied on the electrode current collector and/or the electrode active material layer. Thus, the oxidation of the electrode current collector is prevented to reduce resistance, and the adhesion between the electrode current collector and the electrode active material is increased, leasing to increases in ohmic contacts and cycle life. Also, the porous film serving as a separator is formed on one surface of the electrode plate, such that a battery comprising the electrode can perform its function without needing an additional separator. Accordingly, the present invention provides a lithium battery which has high ion conductivity and, at the same time, is stable under conditions of overcharge and high temperature.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A lithium secondary battery comprising:
an electrode consisting of:
an electrode current collector layer;
a first Si-containing material layer having a thickness of 0.005 μm to 1 μm formed on the electrode current collector layer;
an electrode active material layer formed on the first Si-containing material layer;
a second Si-containing material layer having a thickness of 0.005 μm to 1 μm formed on the electrode active material layer; and
a porous film layer formed to surround the entire surfaces of the electrode, the Si-containing material layers each comprising a Si-containing compound of Formula II:

(II)

wherein $R_1$, $R_2$ and $R_3$ each independently represents a hydrogen atom, a halogen atom, a hydroxyl group, a substituted or unsubstituted amine group, a substituted or unsubstituted thiol group, a substituted or unsubstituted $C_1$-$C_{20}$ alkyl group, a substituted or unsubstituted $C_3$-$C_{20}$ cycloalkyl group, a substituted or unsubstituted $C_1$-$C_{20}$ alkenyl group, a substituted or unsubstituted $C_1$-$C_{20}$ alkoxy group, a substituted or unsubstituted $C_6$-$C_{30}$ aryl group, a substituted or unsubstituted $C_6$-$C_{30}$ aryloxy group, or a substituted or unsubstituted $C_1$-$C_{20}$ alkylcarbonyl group;

$R_4$, $R_5$ and $R_6$ each independently represents a hydrogen atom, a halogen atom, a hydroxyl group, a substituted or unsubstituted amine group, —SH, a substituted or unsubstituted $C_1$-$C_{20}$ alkyl group, a substituted or unsubstituted $C_3$-$C_{20}$ cycloalkyl group, a substituted or unsubstituted $C_1$-$C_{20}$ alkenyl group, a substituted or unsubstituted $C_1$-$C_{20}$ alkoxy group, a substituted or unsubstituted $C_6$-$C_{30}$ aryl group, a substituted or unsubstituted $C_6$-$C_{30}$ aryloxy group, or a substituted or unsubstituted $C_1$-$C_{20}$ alkylcarbonyl group; and $X_1$ is —O—, —NH—, a substituted or unsubstituted $C_1$-$C_{20}$ alkylene group, a substituted or unsubstituted $C_2$-$C_{20}$ alkenylene group, or a substituted or unsubstituted $C_6$-$C_{30}$ arylene group;

the porous film layer comprises a ceramic powder and a polymer resin, and the weight ratio of the ceramic powder and the polymer resin is 98:2 to 85:15.

2. The lithium secondary battery of claim 1, wherein said $R_1$, $R_2$, $R_3$, $R_4$, $R_5$ and $R_6$ are each independently a hydrogen atom, a halogen atom, a hydroxyl group, an amine group, —SH, an alkyl group having 1-6 carbon atoms, a cycloalkyl group having 3-8 carbon atoms, an alkenyl group having 2-6 carbon atoms, an alkoxy group having 1-6 carbon atoms, an aryl group having 6-9 carbon atoms, an aryloxy group having 6-9 carbon atoms, or an alkylcarbonyl group having 1-3 carbon atoms, and said $X_1$ is —NH—, —O—, an alkylene group having 1-6 carbon atoms, an alkenylene group having 2-6 carbon atoms, or an arylene group having 6-9 carbon atoms.

3. The lithium secondary battery of claim 1, wherein the Si-containing compound is hexamethyl disilazane.

4. The lithium secondary battery of claim 1, wherein the porous film layer comprises a ceramic material and a polymer resin, and the porous film layer has a thickness of about 1.5 to 30 μm.

5. The lithium secondary battery of claim 1, further comprising an electrolyte, and the electrode is a negative electrode, or a positive electrode.

6. A lithium secondary battery comprising:
an electrode consisting of:
an electrode current collector layer;
an electrode active material layer formed on the electrode current collector layer;
a Si-containing material layer having a thickness of 0.005 μm to 1 μm formed on the electrode active material layer; and a porous film layer formed to surround the entire surfaces of the electrode, the entire surfaces comprising an inner surface, an outer surface, an upper end and a lower end;
the Si-containing material layer comprising a Si-containing compound of Formula II:

(II)

wherein $R_1$, $R_2$ and $R_3$ each independently represents a hydrogen atom, a halogen atom, a hydroxyl group, a substituted or unsubstituted amine group, a substituted or unsubstituted thiol group, a substituted or unsubstituted $C_1$-$C_{20}$ alkyl group, a substituted or unsubstituted $C_3$-$C_{20}$ cycloalkyl group, a substituted or unsubstituted $C_1$-$C_{20}$ alkenyl group, a substituted or unsubstituted $C_1$-$C_{20}$ alkoxy group, a substituted or unsubstituted $C_6$-$C_{30}$ aryl group, a substituted or unsubstituted $C_6$-$C_{30}$ aryloxy group, or a substituted or unsubstituted $C_1$-$C_{20}$ alkylcarbonyl group;

$R_4$, $R_5$ and $R_6$ each independently represents a hydrogen atom, a halogen atom, a hydroxyl group, a substituted or unsubstituted amine group, —SH, a substituted or unsubstituted $C_1$-$C_{20}$ alkyl group, a substituted or unsubstituted $C_3$-$C_{20}$ cycloalkyl group, a substituted or unsubstituted $C_1$-$C_{20}$ alkenyl group, a substituted or unsubstituted $C_1$-$C_{20}$ alkoxy group, a substituted or unsubstituted $C_6$-$C_{30}$ aryl group, a substituted or unsubstituted $C_6$-$C_{30}$ aryloxy group, or a substituted or unsubstituted $C_1$-$C_{20}$ alkylcarbonyl group; and $X_1$ is —O—, —NH—, a substituted or unsubstituted $C_1$-$C_{20}$ alkylene group, a substituted or unsubstituted $C_2$-$C_{20}$ alkenylene group, or a substituted or unsubstituted $C_6$-$C_{30}$ arylene group; and the porous film layer comprises a ceramic powder and a polymer resin, and the weight ratio of the ceramic powder and the polymer resin is 98:2 to 85:15.

7. A lithium secondary battery comprising:
an electrode consisting of:
an electrode current collector layer;
a Si-containing material layer having a thickness of 0.005 μm to 1 μm formed on the electrode current collector layer;
an electrode active material layer formed on the Si-containing material layer; and
a porous film layer formed to surround the entire surfaces of the electrode; and wherein
the Si-containing material layer comprising a Si-containing compound of Formula II:

(II)

wherein $R_1$, $R_2$ and $R_3$ each independently represents a hydrogen atom, a halogen atom, a hydroxyl group, a substituted or unsubstituted amine group, a substituted or unsubstituted thiol group, a substituted or unsubstituted $C_1$-$C_{20}$ alkyl group, a substituted or unsubstituted $C_3$-$C_{20}$ cycloalkyl group, a substituted or unsubstituted $C_1$-$C_{20}$ alkenyl group, a substituted or unsubstituted $C_1$-$C_{20}$ alkoxy group, a substituted or unsubstituted $C_6$-$C_{30}$ aryl group, a substituted or unsubstituted $C_6$-$C_{30}$ aryloxy group, or a substituted or unsubstituted $C_1$-$C_{20}$ alkylcarbonyl group;

$R_4$, $R_5$ and $R_6$ each independently represents a hydrogen atom, a halogen atom, a hydroxyl group, a substituted or unsubstituted amine group, —SH, a substituted or unsubstituted $C_1$-$C_{20}$ alkyl group, a substituted or unsubstituted $C_3$-$C_{20}$ cycloalkyl group, a substituted or unsubstituted $C_1$-$C_{20}$ alkenyl group, a substituted or unsubstituted $C_1$-$C_{20}$ alkoxy group, a substituted or unsubstituted $C_6$-$C_{30}$ aryl group, a substituted or unsubstituted $C_6$-$C_{30}$ aryloxy group, or a substituted or unsubstituted $C_1$-$C_{20}$ alkylcarbonyl group; and $X_1$ is —O—, —NH—, a substituted or unsubstituted $C_1$-$C_{20}$ alkylene group, a substituted or unsubstituted $C_2$-$C_{20}$ alkenylene group, or a substituted or unsubstituted $C_6$-$C_{30}$ arylene group;

the porous film layer comprises a ceramic powder and a polymer resin, and the weight ratio of the ceramic powder and the polymer resin is 98:2 to 85:15.

8. The lithium secondary battery of claim 6, further comprising an electrolyte, and the electrode is a negative electrode, or a positive electrode.

9. The lithium secondary battery of claim 7, further comprising an electrolyte, and the electrode is a negative electrode, or a positive electrode.

10. The lithium secondary battery of claim 6, wherein said $R_1$, $R_2$, $R_3$, $R_4$, $R_5$ and $R_6$ are each independently a hydrogen atom, a halogen atom, a hydroxyl group, an amine group, —SH, an alkyl group having 1-6 carbon atoms, a cycloalkyl group having 3-8 carbon atoms, an alkenyl group having 2-6 carbon atoms, an alkoxy group having 1-6 carbon atoms, an aryl group having 6-9 carbon atoms, an aryloxy group having 6-9 carbon atoms, or an alkylcarbonyl group having 1-3 carbon atoms, and said $X_1$ is —NH—, —O—, an alkylene group having 1-6 carbon atoms, an alkenylene group having 2-6 carbon atoms, or an arylene group having 6-9 carbon atoms.

11. The lithium secondary battery of claim 7, wherein said $R_1$, $R_2$, $R_3$, $R_4$, $R_5$ and $R_6$ are each independently a hydrogen atom, a halogen atom, a hydroxyl group, an amine group, —SH, an alkyl group having 1-6 carbon atoms, a cycloalkyl group having 3-8 carbon atoms, an alkenyl group having 2-6 carbon atoms, an alkoxy group having 1-6 carbon atoms, an aryl group having 6-9 carbon atoms, an aryloxy group having 6-9 carbon atoms, or an alkylcarbonyl group having 1-3 carbon atoms, and said $X_1$ is —NH—, —O—, an alkylene group having 1-6 carbon atoms, an alkenylene group having 2-6 carbon atoms, or an arylene group having 6-9 carbon atoms.

12. The lithium secondary battery of claim 6, wherein the Si-containing compound is hexamethyl disilazane.

13. The lithium secondary battery of claim 7, wherein the Si-containing compound is hexamethyl disilazane.

14. The lithium secondary battery of claim 6, wherein the porous film layer comprises a ceramic material and a polymer resin, and the porous film layer has a thickness of about 1.5 to 30 μm.

15. The lithium secondary battery of claim 7, wherein the porous film layer comprises a ceramic material and a polymer resin, and the porous film layer has a thickness of about 1.5 to 30 μm.

16. The lithium secondary battery of claim 1, wherein the ceramic powder is secondary particles, and the secondary particles are grape bunch-shaped clusters with size of 0.01 μm to 0.3 μm, or layered particle clusters with width of 100 nm to 1.0 μm.

17. The lithium secondary battery of claim 1, wherein the ceramic powder has a thermal expansion of less than 0.2% at a temperature of 200° C. and a thermal expansion of 0.1-0.4% at a temperature of 400° C.

18. The lithium secondary battery of claim 1, wherein the porous film layer has a void ratio of more than 50%.

\* \* \* \* \*